Aug. 10, 1954

J. A. CARVER 2,686,110

REACTOR

Filed Feb. 15, 1951

2 Sheets-Sheet 1

John A. Carver  Inventor

By W. O. J Heilman Attorney

Aug. 10, 1954 J. A. CARVER 2,686,110
REACTOR
Filed Feb. 15, 1951 2 Sheets-Sheet 2

John A. Carver Inventor
By W. O. T Heilman Attorney

Patented Aug. 10, 1954

2,686,110

UNITED STATES PATENT OFFICE 2,686,110

REACTOR

John A. Carver, Scotch Plains, N. J., assignor to Standard Oil Development Company, a corporation of Delaware Application February 15, 1951, Serial No. 211,049

3 Claims. (Cl. 23—285)

This invention relates to the polymerization of normally gaseous olefins to liquid hydrocarbons comprising essentially aliphatic polymers or copolymers suitable for use in the manufacture of motor fuel.

Conventional polymerization processes utilize a moderately active catalyst in a fixed bed operation. The catalyst is packed inside long tubes around which a cooling medium circulates. These tubes are normally 2 to 5 inches in diameter. Another type process utilizes large chambers packed with the catalyst. Due to the large amount of heat produced in the polymerization reaction, more or less local overheating occurs in these catalyst beds, whether in tubes or chambers, and much of the catalyst in the bed is therefore deactivated as the process proceeds; usually only a small portion of the catalyst is actually being efficiently utilized at any given time. In the initial stages of the process the initial 20 or 30 per cent of the catalyst is doing the bulk of the polymerization; later this catalyst will become inactive and often fused together so that only the last portions of the catalyst are being used.

In the copending application, Serial No. 152,858, filed March 30, 1950, in the name of William K. Fell and John D. Leslie, now Patent No. 2,626,290, it has been suggested that this difficulty might be overcome by utilizing a fluidized solid or slurry type operation with finely divided catalyst suspended in or slurried in the fluid reactants, at pressures above the critical. Good mixing is generally a criterion of a successful fluid or slurry operation with the result that composition and temperature throughout the reaction zone are quite uniform. However operational experience indicates that when agitation is sufficient to ensure the good mixing required it has been found that some catalyst is lost in the effluent from the reactor.

According to the present invention means are provided in the reactor for preventing this catalyst carryover.

Figure 1:
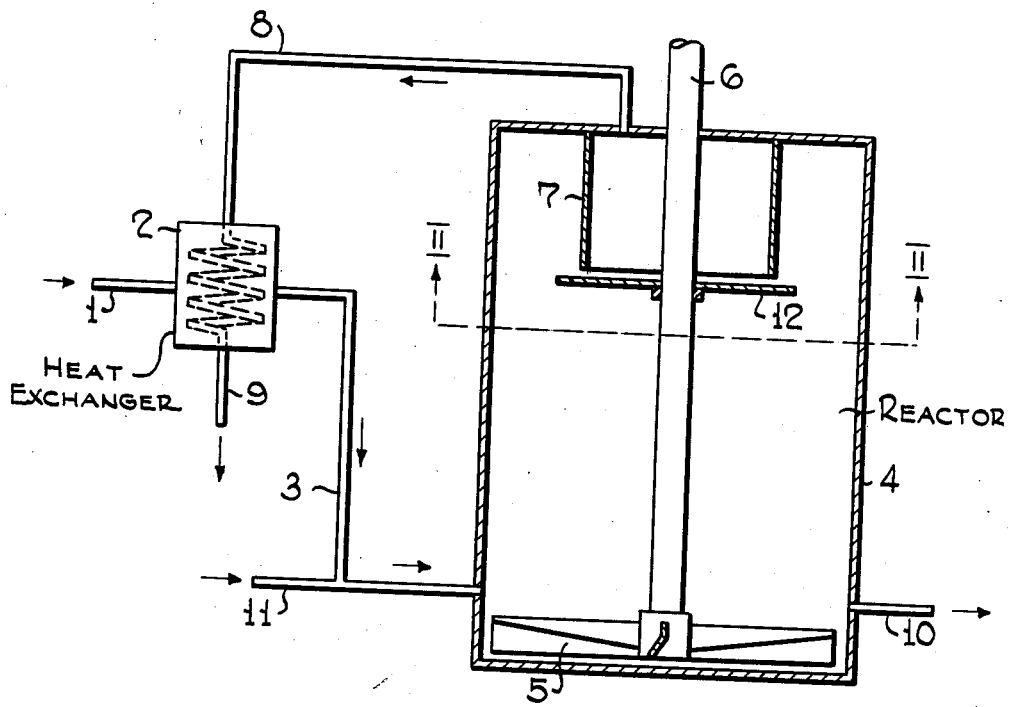
Figure 2:
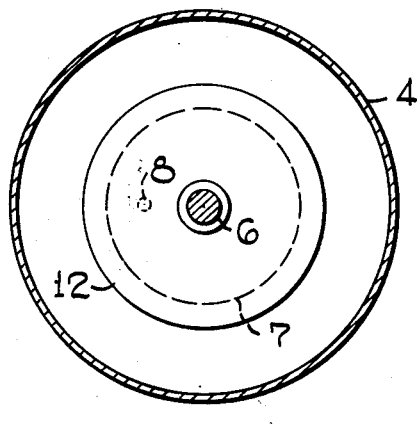
Figure 3:
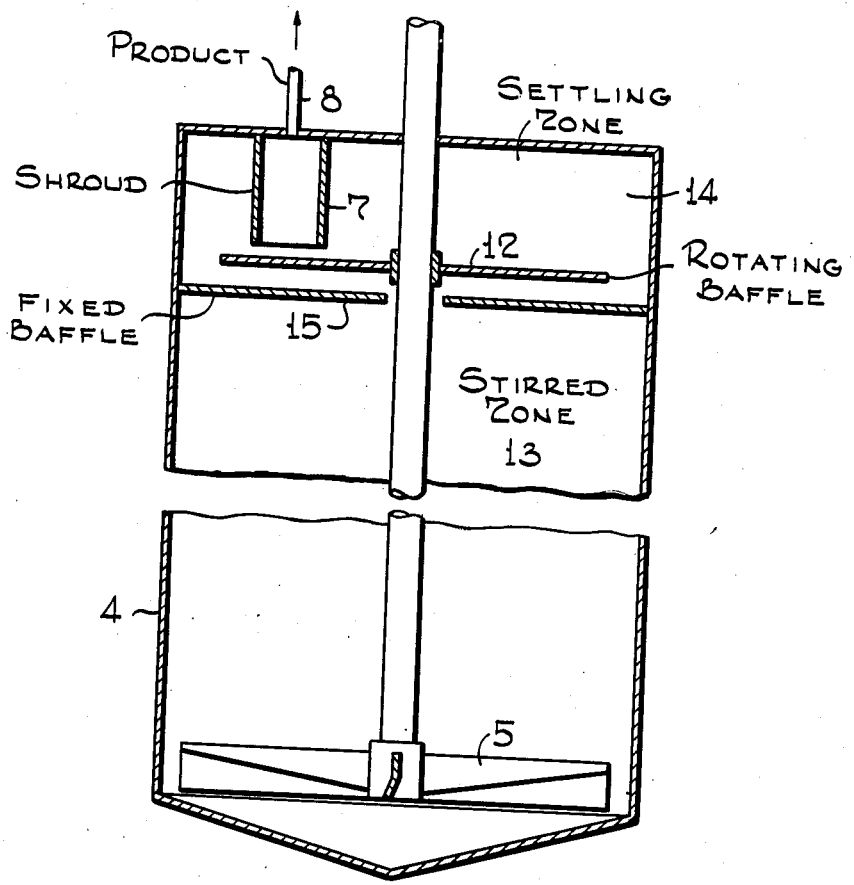

The manner in which the present invention is carried out will be fully understood from the following description when read with reference to the accompanying drawings, wherein Figure 1 is a diagrammatic flow plan drawing illustrating this invention, Fig. 2 is a cross section of the reactor of Fig. 1 taken along lines 2—2 thereof, and Fig. 3 illustrates an alternative embodiment of the reactor of Fig. 1 in which the rotating baffle is placed above a fixed baffle. Referring now to Figs. 1-2.

A normally gaseous $C_3$, $C_4$ hydrocarbon fraction containing 50% paraffins and 50% olefins, the latter consisting of 50% propylene and 50% butylene, is introduced at 100° F. and about 125 lbs./sq. in. gage by line 1 to heat exchanger 2 where it is heated to 250° F. The heated feed is then introduced by line 3 into the bottom of reaction zone 4 maintained under 1000 lbs./sq. in. gage pressure and at a temperature of 450° F. The reaction zone contains a finely divided catalyst consisting of phosphoric acid deposited on kieselguhr of about 140-200 mesh. The feed is introduced upwardly through this catalyst at about 1 to 2 feet per minute and is agitated by stirrer 5 rotating on shaft 6 so that the catalyst is maintained in suspension in the feed. Thus the more dense catalyst particles will lag behind the less dense liquid and the catalyst will concentrate in the lower portion of the reaction zone in a dense phase mass which acts as if it had a level similar to a boiling liquid. However, the conditions are set within the reaction zone so that actually there is only one fluid phase present. These conditions are preferably near the critical temperature and pressure for a 50:50 mixture of polymer and $C_3$, $C_4$ components but outside the region in which two fluid phases appear. Pressures of about 1000 lbs./sq. in. gage in the reaction zone have been found suitable to maintain this single phase.

To prevent agglomeration of the catalyst, there is interdispersed with it about 10-50% by weight of finely divided silica gel of from 140-200 mesh.

The proper state of hydration of the catalyst, if necessary, may be maintained by the introduction of regular quantities of water. This is not illustrated in the drawing but may readily be accomplished by well known means.

The products from zone 4, boiling for the most part in the motor fuel boiling range, are removed through shroud 7 by line 8 and passed through heat exchanger 2 where they give up heat to incoming feed. The cooled products are then passed by line 9 to any desired fractionating or stabilizing means, not shown.

From time to time catalyst is removed from reaction zone 4 through line 10 and burned or otherwise disposed of. Makeup catalyst is added by line 11. However, when operating in the above manner under optimum conditions of mixing, a substantial amount of catalyst is entrained with the effluent vapors. To overcome this, a rotating baffle 12 is attached to shaft 6 just below the shroud 7. Shroud 7 is an enlarged outlet, the cross-sectional area of which is such that the rate of flow of the effluent therethrough is less than the settling rate of the catalyst. The baffle stops catalyst from being carried into the shroud and the rotation prevents the catalyst from settling on the baffle.

Turning now to Fig. 3, there is shown another embodiment of this invention in which the reactor is divided into a stirred zone 13 and a settling zone 14 by baffle 15. This baffle is provided with a plurality of holes to allow communication between the zones. The presence of this baffle affords an additional means for preventing catalyst from being carried out of the reaction zone.

A laboratory experiment carried out with a Lucite model of the reactor filled with liquid containing a slurry of solid particles effectively demonstrated that the settling zone 14 could be kept catalyst free and that very little catalyst carryover through the shroud 7 was encountered.

The nature of the present invention having been thus fully set forth and specific examples of the same given, what is claimed as new and useful and desired to be secured by Letters Patent is:

1. A polymerization reactor comprising in combination a shell having means for adding solid catalyst and reactants thereto and a top outlet means for withdrawing products therefrom, an agitator in said shell, a shroud surrounding said outlet and a rotating horizontal baffle positioned below and covering the mouth of said shroud for preventing the entrainment of catalyst with said product.

2. A polymerization reactor comprising in combination a shell having means for adding finely divided solid catalyst and reactants thereto and an outlet means in the top of the shell for withdrawing products therefrom, a vertical shaft passing vertically through said shell, an agitator blade on the lower end of said shaft in said shell, a rotating horizontal baffle on said shaft in the upper part of said shell and a shroud surrounding said top outlet and extending into said shell to a point just above said rotating baffle; said baffle covering the mouth of said shroud.

3. A polymerization reactor comprising in combination a shell having means for adding finely divided solid catalyst and reactants thereto and outlet means in the top thereof for withdrawing products therefrom, a vertical shaft passing through said shell, an agitator blade on the lower end of said shaft in said shell, a rotating horizontal baffle on said shaft in the upper part of said shell and a shroud surrounding said outlet and vertically extending into said shell to a point just above said rotating baffle and a horizontal stationary perforated baffle placed from wall to wall of said shell just below said rotating baffle.

References Cited in the file of this patent

UNITED STATES PATENTS

| Number | Name | Date |
| --- | --- | --- |
| 1,876,994 | Mann | Sept. 13, 1932 |
| 1,932,531 | Parker | Oct. 31, 1933 |
| 2,079,158 | De Rachat | May 4, 1937 |
| 2,242,979 | Muncie | May 20, 1941 |
| 2,460,987 | Kanhofer | Feb. 8, 1949 |
| 2,561,852 | Funsten | July 24, 1951 |